US012769881B2

(12) United States Patent
Brunn et al.

(10) Patent No.: US 12,769,881 B2
(45) Date of Patent: Oct. 20, 2026

(54) SECURITY RESPONSE ANONYMIZER

(71) Applicant: International Business Machines Corporation, Armonk, NY (US)

(72) Inventors: Jonathan F. Brunn, Logan, UT (US); Chinar Kaul, Austin, TX (US); Garrett Thomas Steele, Pittsburgh, PA (US); Alexis Manyrath, Tigard, OR (US); Benyoshi G. Aoki-Sherwood, Robbinsdale, MN (US)

(73) Assignee: International Business Machines Corporation, Armonk, NY (US)

( * ) Notice: Subject to any disclaimer, the term of this patent is extended or adjusted under 35 U.S.C. 154(b) by 12 days.

(21) Appl. No.: 18/931,430

(22) Filed: Oct. 30, 2024

(65) Prior Publication Data

US 2026/0119711 A1 Apr. 30, 2026

(51) Int. Cl.
*G06F 21/62* (2013.01)

(52) U.S. Cl.
CPC ................................ *G06F 21/6254* (2013.01)

(58) Field of Classification Search
CPC .................................................. G06F 21/6254
USPC ........................................................... 726/26
See application file for complete search history.

(56) References Cited

U.S. PATENT DOCUMENTS 9,665,722 B2 5/2017 Nagasundaram et al.
9,928,383 B2 3/2018 York et al.
10,158,676 B2 12/2018 Barday
10,805,354 B2 10/2020 Barday
12,061,722 B1 * 8/2024 Pena ......................... H04L 9/50
2012/0303616 A1 * 11/2012 Abuelsaad ............ G06F 16/122
707/736
2016/0248743 A1 * 8/2016 Milman .............. G06F 21/6218
2017/0070480 A1 3/2017 Blumenfeld et al.
2020/0050795 A1 * 2/2020 Solomon ............. G06F 16/2255
(Continued)

OTHER PUBLICATIONS

Gruteser, et al., Anonymous Usage of Location-Based Services Through Spatial and Temporal Cloaking, Proceedings of the 1st international conference on Mobile systems, Applications and Services. May 5-8, 2003, pp. 31-42.
(Continued)

*Primary Examiner* — Moeen Khan
(74) *Attorney, Agent, or Firm* — Yee & Associates, P.C.

(57) ABSTRACT

A method masks information from sources accessed over a network. Information for a task and pattern matching information accessed from an initial source in the sources is received in response to the initial source receiving an initial request for the information. Identity information in the information is replaced with anonymized information for a person in the task using the pattern matching information. The identity information relates to attributes of the person and the anonymized information masks the identity information. The information for the task with the anonymized information is sent to a human machine interface. Additional information for the task is accessed from sources in response to receiving a request for the additional information. The identity information relating to the attributes is replaced with the anonymized information in the additional information. The additional information is sent with the anonymized information to the human machine interface.

15 Claims, 7 Drawing Sheets

(56) References Cited

U.S. PATENT DOCUMENTS

| | | | | |
|---|---|---|---|---|
| 2021/0304341 | A1* | 9/2021 | Green | G06Q 10/40 |
| 2024/0291863 | A1* | 8/2024 | Cohen | H04L 63/1491 |

OTHER PUBLICATIONS

Pawlicka, et al., Guidelines for Stego/Malware Detection Tools: Achieving GDPR Compliance, IEEE Technology and Society Magazine, Dec. 2, 2020, vol. 39, Issue 4, pp. 60-70.

Qureshi, et al., Collaborative and Efficient Privacy-Preserving Critical Incident Management System, Expert Systems with Applications, Jan. 2021, vol. 163, 4 pages.

* cited by examiner

SECURITY RESPONSE ANONYMIZER

BACKGROUND

The disclosure relates generally to an improved computer system and more specifically to anonymizing user information for security response analysis.

A security operations center (SOC) manages security responses to different security alerts. A security alert may involve an observable occurrence of an event in a system or network that is flagged as suspicious. The security alert may also include an indication that a malicious or abnormal event has occurred such as an unusual login or unauthorized access. Further, security alerts can also be triggered when an event occurs that deviates from a normal pattern.

The SOC can include automated systems to monitor networks and applications for suspicious activity that indicate the presence of a security alert. In response to detecting a security alert, a responder analyzes the security alert to determine what additional steps may be needed. For example, a responder may correlate information for a person involved in the security alert with a user profile for the person. This information may be used as part of reviewing user access patterns, permissions, and roles to determine whether unusual behavior stems from legitimate activity or a potential breach. In other words, this information may be reviewed to determine the role of the person in the security alert to understand whether actions indicated in the security alert are likely to be normal in the context of the role.

In addition, the responder may look up other information and other systems such as a device registry, a social media platform, a professional networking platform, a human resources (HR) system, a location database, an end point detection and response (EDR) system, and other systems to perform the analysis. This contextual information may also be used to determine whether the security alert is an actual potential security breach or a false positive.

SUMMARY

According to one illustrative embodiment, a method masks information from sources accessed over a network. Information for a task and pattern matching information accessed from an initial source in the sources is received in response to the initial source receiving an initial request for the information. Identity information in the information is replaced with anonymized information for a person in the task using the pattern matching information. The identity information relates to attributes of the person and the anonymized information masks the identity information. The information for the task with the anonymized information is sent to a human machine interface. Additional information for the task is accessed from a number of sources in the sources in addition to the initial source over the network in response to receiving a request for the additional information from the human machine interface. The identity information relating to the attributes of the person is replaced with the anonymized information in the additional information received from the number of sources. The additional information is sent with the anonymized information to the human machine interface. According to other illustrative embodiments, a computer system and a computer program product for the information from sources accessed over a network are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
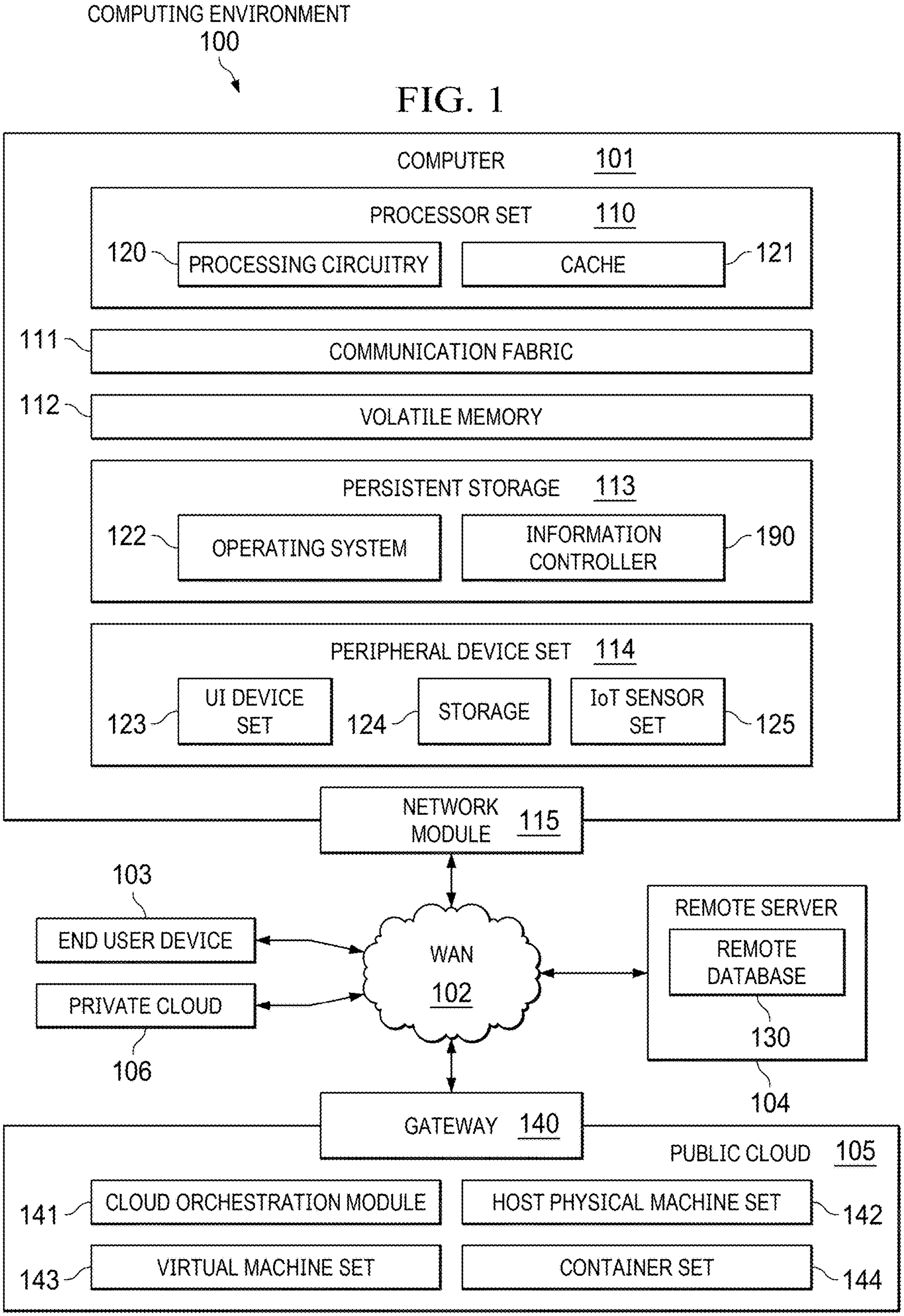
FIG. 1 is a block diagram of a computing environment in accordance with an illustrative embodiment.

With reference now to the figures in particular with reference to FIG. 1, a block diagram of a computing environment is depicted in accordance with an illustrative embodiment. Computing environment 100 contains an example of an environment for the execution of at least some of the computer code involved in performing the inventive methods, such as information controller 190. In addition to information controller 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and information controller 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in information controller 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in information controller 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers.

IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES: Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The illustrative embodiments recognize and take into account one or more different considerations as described herein. Ideally, information is automatically collected for the responder in a security orchestration and response (SOAR) system for use in processing security alerts. However, information needed for processing these alerts are often fragmented among various systems. As a result, the responder can become aware of the user's identity, including aspects which may not be relevant to the incident. This additional information can trigger biases, explicit or not, of the responder.

For example, a security alert indicates insider behavior from within an organization. In this case, the responder analyzing this security alert may infer attributes of the person in the security alert that is not relevant to the analysis from viewing the name and profile photograph of the person. In some instances, knowing these attributes may bias the responder's decision to escalate an incident, which is an undesirable result.

With this in mind, a recommended best practice for analyzing insider incidents is anonymization of the subject of an investigation to mask the identities until after an initial decision is made to assess a security alert. However, it is difficult to remove all information that may cause bias in analyzing the security alert, especially when the information needed to analyze a security alert is in multiple locations and in different forms or formats.

This type of analysis can be applicable to many different types of tasks. For example, this analysis can be applied to security alert processing, a candidate assessment, a mortgage underwriting, a credit assessment, and other suitable types of tasks in which information may be desirable.

Thus, the illustrative examples provide a method, apparatus, computer system, and computer program product for selectively masking information used in processing tasks such as security alerts. In one illustrative example, a method masks information from sources accessed over a network. Information for a task and pattern matching information accessed from an initial source in the sources is received in response to the initial source receiving an initial request for the information. Identity information in the information is replaced with anonymized information for a person in the task using the pattern matching information. The identity information relates to attributes of the person and the anonymized information masks the identity information. The information for the task with the anonymized information is sent to a human machine interface. Additional information for the task is accessed from a number of sources in the sources in addition to the initial source over the network in response to receiving a request for the additional information from the human machine interface. The identity information relating to the attributes of the person is replaced with the anonymized information in the additional information received from the number of sources. The additional information is sent with the anonymized information to the human machine interface.

Figure 2:
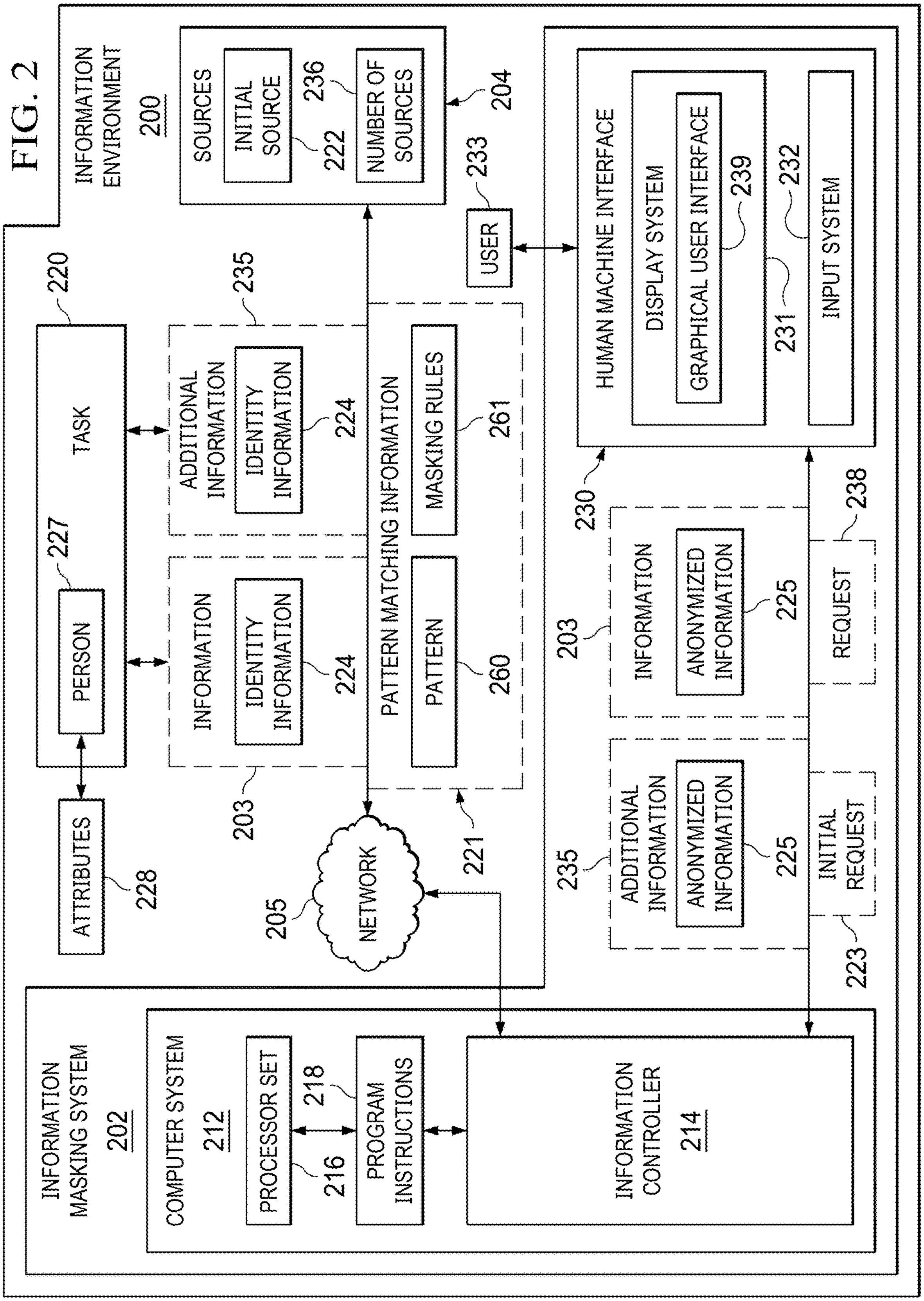
FIG. 2 is a block diagram of an information environment in accordance with an illustrative embodiment.

With reference now to FIG. 2, a block diagram of an information environment is depicted in accordance with an illustrative embodiment. In this illustrative example, information environment 200 includes components that can be implemented in hardware such as the hardware shown in computing environment 100 in FIG. 1. In this example, information masking system 202 can operate to mask information 203 from sources 204 accessed over network 205. In this illustrative example, sources 204 can take a number of different forms.

For example, sources 204 can comprise at least one of a website, a database, a webservices, a cloud storage server, an Internet of Things device (IoT), an email server, or other sources of information 203. In these illustrative examples, a source in sources 204 is an entity that user 233 interacts with to perform task 220. Further in these examples, a source is in contrast to a proxy, which is an intermediary and not what user 233 interacts with to obtain information 203.

In this example, the phrase "at least one of," when used with a list of items, means different combinations of one or more of the listed items can be used, and only one of each item in the list may be needed. In other words, "at least one of" means any combination of items and a number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Network 205 is the medium used to provide communications links between various devices and computers connected together within information environment 200. Network 205 can include connections, such as wire, wireless communication links, or fiber optic cables. In the depicted example, network 205 is the Internet comprising a world-wide collection of networks and gateways that use the Transmission Control Protocol/Internet Protocol (TCP/IP) suite of protocols or other networking protocols to communicate with one another. In these examples, network 205 can be comprised of at least one of the Internet, an intranet, a local area network (LAN), a metropolitan area network (MAN), or a wide area network (WAN).

Information controller 214 may be implemented using information controller 190 in FIG. 1. In this example, information controller 214 can be implemented in software, hardware, firmware, or a combination thereof. When software is used, the operations performed by information controller 214 can be implemented in program instructions configured to run on hardware, such as a processor unit. When firmware is used, the operations performed by information controller 214 can be implemented in program instructions and data can be stored in persistent memory to run on a processor unit. When hardware is employed, the hardware can include circuits that operate to perform the operations in information controller 214.

In the illustrative examples, the hardware can take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes processor set 216 that is capable of executing program instructions 218 implementing processes in the illustrative examples. In other words, program instructions 218 are computer-readable program instructions. Processor set 216 is an example of processor set 110 in FIG. 1.

As used herein, a processor unit in processor set 216 is a hardware device and is comprised of hardware circuits such as those on an integrated circuit that respond to and process instructions and program code that operate a computer. Processor set 216 can be a number of processor units that can be implemented using processor set 110 in FIG. 1. The processor units can also be referred to as computer processors. When processor set 216 executes program instructions 218 for a process, processor set 216 can be one or more processor units that are in the same computer or in different computers. In other words, the process can be distributed between processor units in processor set 216 on the same or different computers in computer system 212.

Further, processor set 216 can include the same type or different types of processor units. For example, processor set 216 can be selected from at least one of a single core processor, a dual-core processor, a multi-processor core, a general-purpose central processing unit (CPU), a graphics processing unit (GPU), a digital signal processor (DSP), or some other type of processor unit.

Although not shown, processor set 216 can also include other components in addition to the processor units or processing circuitry. For example, processor set 216 can also include a cache or other components used with processor units or other processing circuitry.

In this example, information controller 214 can be implemented in a number of different ways. For example, information controller 214 can be a user agent, a browser, a proxy, a browser extension, a plug-in, or in some suitable type of component. Further, information controller 214 can be a single component in a computer and computer system 212 or distributed components within one or more computers in computer system 212.

In this illustrative example, information controller 214 receives information 203 for task 220 and pattern matching information 221 accessed from initial source 222 in sources 204 in response to initial source 222 receiving initial request 223 for information 203. Initial request 223 is generated by user 233 operating human machine interface (HMI) 230.

Pattern matching information 221 can be received in a number of different ways from initial source 222. For example, pattern matching information 221 can take the form of metadata received in a response header, metadata embedded with information 203, or in a separate message from initial source 222. In this illustrative example, this pattern matching information is used to replace identity information 224 within information 203 as well as additional information 235 that may be obtained from number of sources 236 that may be searched in addition to initial source 222. Further, number of sources 236 may be all other sources that may be searched for some selected sources. When selected sources are present, those sources may be identified in pattern matching information 221 or using other mechanisms. For example, number of sources 236 can be any source of sources 204 that contains information about person 227.

Further, enhanced security includes determining when initial source 222 should be trusted to provide pattern matching information 221. For example, a certificate, a list of approved network locations, or other information can be used to enable trusting initial source 222. In another example, user 233 can be prompted to determine whether to "trust once" or "trust always" initial source 222 to provide pattern matching information 221.

In one example, information 203 for task 220 can be received in the body of a hypertext transfer protocol (HTTP) response. With this example, pattern matching information 221 is received in a response header in the hypertext transfer protocol response. Thus, pattern matching information 221 can be received in a response header, or a page within a body containing information 203.

Pattern matching information 221 can take a number of different forms. For example, pattern matching information 221 comprises at least one of pattern 260 or a set of masking rules 261. As used herein, "a set of" used with reference items means one or more items. For example, a set of masking rules 261 is one or more of masking rules 261.

In this example, pattern 260 can be selected from at least one of an exact string for replacement, a regex, a CSS selector, a wild card expression, a glob, or some other suitable pattern. In yet other examples, the pattern can be a machine learning model trained to identify attributes for the patterns. The set of masking rules 261 can be one or more rules that define at least one item of information that should be replaced, and how the replacement should occur. For example, the set of masking rules 261 can be rules for masking identity information 224, such as at least one of credit card information, a phone number, a name, an email address, a home address, a driver's license number, an IP address, or other types of information that can be used to determine attributes 228 for person 227. Further, these rules can also indicate that the replacement of identity information 224 with an anonymized information 225 can be performed based on a role of user 233.

In this example, human machine interface 230 comprises display system 231 and input system 232. Display system 231 is a physical hardware system and includes one or more display devices on which graphical user interface 239 can be displayed. The display devices can include at least one of a light emitting diode (LED) display, an organic light emitting diode (OLED) display, a computer monitor, a projector, a flat panel display, a heads-up display (HUD), a head-mounted display (HMD), smart glasses, augmented reality glasses, or some other suitable device that can output information for the visual presentation of information.

User 233 can interact with graphical user interface 239 through user input generated by input system 232. Input system 232 is a physical hardware system and can be selected from at least one of a mouse, a keyboard, a touch pad, a trackball, a touchscreen, a stylus, a motion sensing input device, a gesture detection device, a data glove, a cyber glove, a haptic feedback device, or some other suitable type of input device.

Information controller 214 replaces identity information 224 in information 203 with anonymized information 225 for person 227 in task 220 using the pattern matching information 221. In this example, identity information 224 relates to attributes 228 of person 227. Anonymized information 225 masks identity information 224. This information is masked when displayed in display system 231 in human machine interface 230. In other words, user 233 views anonymized information 225 in information 203 in place of identity information 224. In this illustrative example, identity information 224 masked in information 203 is information that is considered to be irrelevant to the performance of task 220. Further, this information may cause bias by user 233 when viewed in processing task 220.

In this example, identity information 224 is information that can be directly or indirectly used to identify attributes 228 of person 227. In this illustrative example, attributes 228 of person 227 are characteristics that help define, describe, or distinguish one person from another person. These characteristics can be physical, personal, social, or other features. Identity information 224 includes at least one of an age, a facial feature, a nationality, an occupation, a home address, a phone number, a profile picture, or other information that can be used to determine attributes 228 of person 227.

Information controller 214 sends information 203 for task 220 with anonymized information 225 to human machine interface (HMI) 230. In this example, user 233 is a person who views information 203 and performs other steps or operations to perform task 220.

In this example, information controller 214 accesses additional information 235 for task 220 from number of sources 236 in sources 204 in addition to initial source 222 over network 205 in response to receiving request 238 for additional information 235 from human machine interface 230.

In this illustrative example, user 233 can generate request 238 to access additional information 235. In this example, user 233 uses anonymized information 225 to generate request 238 using anonymized information 225 for person 227 in information 203 because identity information 224 is not available to user 233 viewing information 203 on human machine interface 230.

In this example, identity information 224 replaced with anonymized information 225 is retained by information controller 214. This information can be used to enable user 233 to search other sources 204 using anonymized information 225.

For example, request 238 to search for information is generated by user 233 and received by information controller 214. Request 238 includes anonymized information 225 such as John Doe for the name of person 227 and JD@masked.address.com as an email address 227 person 227.

With this example, information controller 214 identifies this anonymized information in request 238. Information controller 214 restores identity information 224 corresponding to anonymized information 225 in request 238.

For example, the name John Doe and the email address JD@masked.address.com can be replaced with identity information 224 comprising the actual name and email address of person 227. In this manner, searches can be performed for information about person 227 in forming task 220 without user 233 seeing identity information 224.

Information controller 214 sends request 238 to number of sources 236 in which anonymized information 225 in request 238 has been replaced with identity information 224. As a result, number of sources 236 can process request 238 and return additional information 235. In response, additional information 235 is returned from number of sources 236.

Information controller 214 replaces identity information 224 relating to attributes 228 of person 227 in additional information 235 received from number of sources 236 with anonymized information 225. Information controller 214 sends additional information 235 with anonymized information 225 to human machine interface 230.

User 233 can view additional information 235 with anonymized information 225 as part of performing task 220. Thus, additional information 235 can be accessed from sources 204 in which information controller 214 consistently replaces identity information 224 with anonymized information 225 received from different sources in sources 204. In this example, information controller 214 can perform this process for various different sources in sources 204 using pattern matching information 221 received in response to initial request 223.

In this illustrative example, pattern matching information 221 is used by information controller 214 with the different sources in sources 204 such that identity information 224 is replaced consistently during the accessing of information from sources 204 to perform task 220. In this manner, pattern matching information 221 is used for accessing sources 204 and performing task 220.

As a result, a consistent masking of identity information 224 is performed by information controller 214 returning information to human machine interface 230 for user 233 to use in performing task 220. In this illustrative example, the application of pattern matching information 221 by information controller 214 can occur in a number of different ways. For example, replacement of identity information 224 using pattern matching information 221 can occur during at least one of a session during which task 220 is processed, a period of time, or indefinitely.

In another illustrative example, information controller 214 can intelligently replace identity information 224 with anonymized information 225. For example, information controller 214 can retain selected identity information in response to the selected identity information being used in a context that does not indicate an attribute of person 227. Thus, not all identity information needs to be masked or redacted with anonymized information. Some selected identity information may appear in other contexts other than performance of task 220. For example, other identity information can be used in the context of a header unrelated to person 227 or task 220.

Information controller 214 can use an artificial intelligence system, machine learning model, a natural language processing model, a set of rules, or other suitable system to determine whether to replace that information with anonymized information. Identity information or other personal information returned from sources 204 may not be replaced depending on the context. For example, other persons may be identified as not being persons for which task 220 is being performed. For example, a search may be performed on any source that is a professional networking platform. This search is performed for information about person 227. The results of this search can return identity information 224 for other persons. These other persons are people connected to person 227 or people followed by person 227. In another example, the search may return information for a report to chain in which other persons that person 227 reports to or persons that report to person 227. This information may be useful for user 233 to understand the organization in which person 227 may be located. In this example, the identity information for these other persons may also not be replaced.

Thus, information controller 214 can use pattern matching information 221 to enable user 233 to see identity information for persons that may not be directly involved in the performance of task 220. For example, when task 220 is a security alert, these other persons may be persons not related to the security alert.

In this case, identity information about these other persons may be useful in performing task 220 without generating a bias in performing task 220. In other examples, identity information for any other persons other than the person subject to task 220 may not be replaced. In other words, a blanket replacement of identity information may not occur depending on the context.

In yet another illustrative example, user 233 may have a reason to view identity information 224 for person 227. In this case, information controller 214 can disclose selected identity information in response to receiving a user input from the human machine interface 230 requesting disclosure of the selected identity information. In this example, user 233 making the request for the selected identity information can be logged.

In these examples, computer system 212 can be configured to perform at least one of the steps, operations, or actions described in the different illustrative examples using software, hardware, firmware, or a combination thereof. As a result, computer system 212 operates as a special purpose computer system in which information controller 214 in computer system 212 enables finding consistent masking or replacement of identity information received from different sources. In particular, information controller 214 transforms computer system 212 into a special purpose computer system as compared to currently available general computer systems that do not have information controller 214.

In the illustrative example, the use of information controller 214 in computer system 212 integrates processes into a practical application for masking information resources accessed over a network. The performance of computer system 212 is increased because the matching can be performed in the same manner from different sources using pattern matching information that comprises at least one of a pattern or a set of masking rules. In other words, information controller 214 in computer system 212 is directed to a practical application of processes integrated into information controller 214 in computer system 212 that enables performing a task using information anonymized from a source. This information can be anonymized using pattern matching information received from the source. This pattern matching information is used to mask identity information in the information received from the source. This pattern matching information is also used to mask identity information in additional information received from other sources.

The illustration of information environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, information controller 214 can be used to replace identity information with anonymized information for other users in addition to user 233. The same or different pattern matching information can be applied to additional users in these examples. Further, user 233 can perform multiple tasks in which pattern matching information can be used to mask identity information for those different tasks. The same or different pattern matching information can be part of different tasks. Further, when masking rules are present in the pattern matching information, those rules may be applied differently based on the type of task performed by user 233.

As another example, while the information controller 214 can operate without a configuration using pattern matching information received from a source, information controller 214 can optionally be configured with an initial setup. The set can include clues using natural language processing (NLP) as a preprocessing step to highlight in-page potential attributes to be replaced. An NLP annotation tool searches the page for attributes (name, email, etc.) and highlights these elements.

Then, user 233 reviews each highlighted attribute, identifies what type of field for that highlighted attribute. Each type of attribute can have a rule-based replacement for use with the highlighted field.

For example, names are replaced with an anonymized key and emails are replaced with key@soc.example.com. Then, information controller 214 can associate these rules with a given domain and detect an appropriate HyperText Markup Language/Cascading Style Sheets (HTML/CSS) selector which can identify the field. Optionally, user 233 can select the selector or information controller 214 can select a field for case of identify information.

For example, at a company, the first user to use a w3 Internet page for an employee page conducts the setup process, classifies the fields on the w3 Internet page and selects which pieces of identity should be obfuscated, and selects settings that are stored for the page in the future. When another user uses the tool to obfuscate a w3 Internet page, information controller 214 now knows which pieces of identity information to replace and which rules to use. This type of process is an optional process that can be used with information controller 214 in place of receiving pattern matching information 221 from initial source 222.

Figure 3:
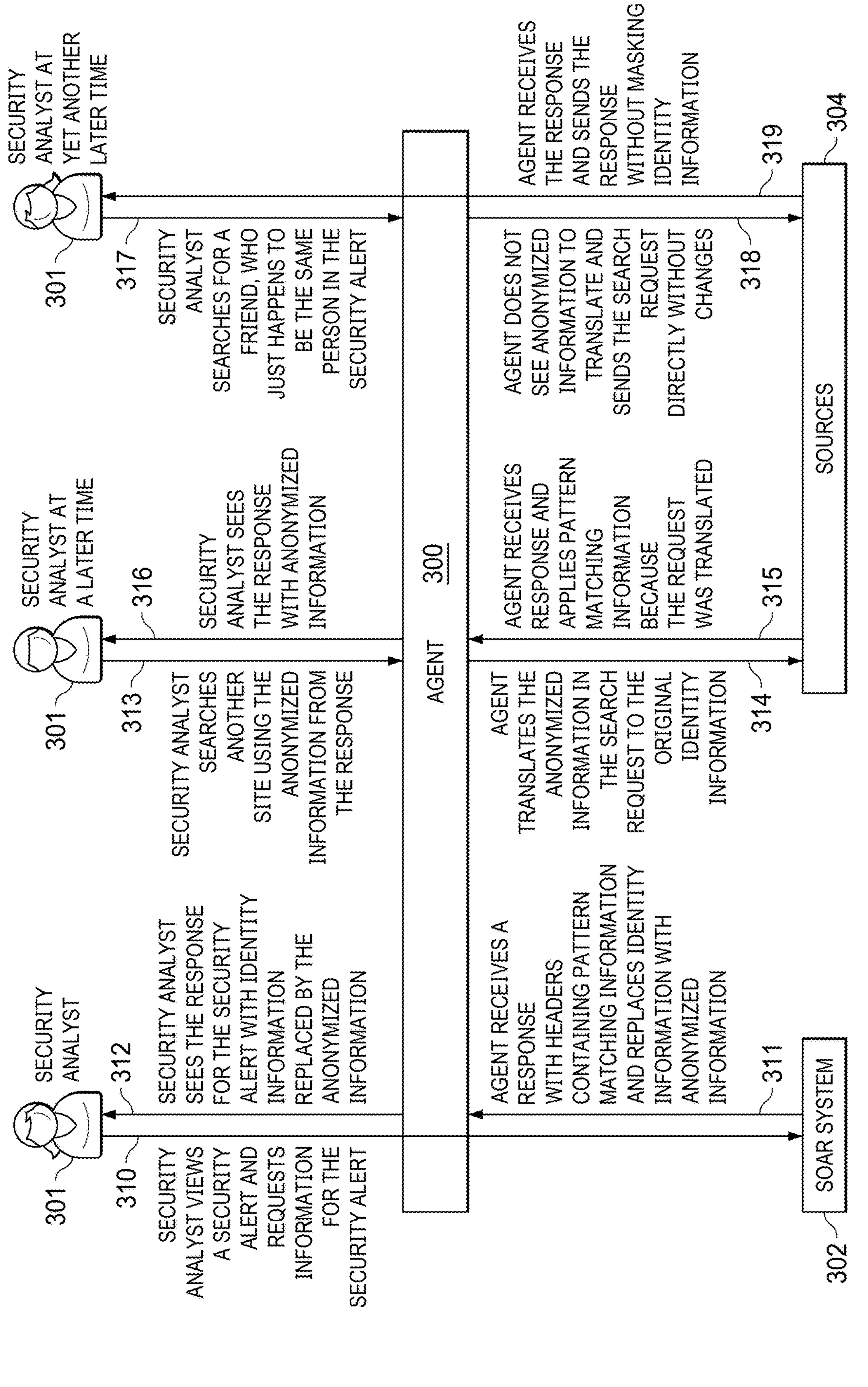
FIG. 3 is a process flow for masking identity information using anonymized information in accordance with an illustrative embodiment.

Turning next to FIG. 3, a process flow for masking identity information using anonymized information is depicted in accordance with an illustrative embodiment. Agent 300 is an example of an implementation for information controller 214 in FIG. 2. Security analyst 301 is an example of user 233 in FIG. 2. For this example, security orchestration, automation, and response (SOAR) system 302 is an example of initial source 222 in sources 204 in FIG. 2. Further in this example, sources 304 are examples of number of sources 236 in sources 204 in FIG. 2. In these examples, these different sources can be implemented as websites.

In this example, security analyst 301 views a security alert in SOAR system 302 and requests information for the security alert (step 310). The security alert is an example of task 220 in FIG. 2. In this example, agent 300 receive a response with headers containing pattern matching information and replaces identity information in response with anonymized information (step 311). In this example, the identity information can be an email address such as jsmith@example.com for a person identified in the security alert. This email address can be replaced with an anonymized or masked version such as 52334@masked.example.com. In this example, the pattern matching information can include rules that applies the same anonymized information across a single source string such as an email address for all users. In other examples, a particular source string may be applied on a per user basis such that each user has a particular string even though the identity information may be identical. In other words, different users may see different anonymized email addresses even though the email address is the same.

Security analyst 301 sees the response for the security alert with identity information replaced by the anonymized information 312. In other words, security analyst 301 sees 52334@masked.example.com and the response instead of jsmoth@example.com.

In this example, security analyst 301 at a later time searches another site using the anonymized information from the response (step 313). In step 313, security analyst 301 uses 52334@masked.example.com to perform the search.

In this case, agent 300 translates the anonymized information in the search request to the original identity information (step 314). In this example, the search contains 52334@masked.example.com with this email address replaced by jsmith@example.com, which is the original email address. In this manner, restoring the identity information enables searches to be performed at sources 304 without security analyst 301 needing to know the identity information. In this example, the sources can be a website containing a profile page, a modern control, or other application that may include identity information.

Agent 300 uses the pattern matching information to perform asking for additional information received from additional searches of sources 304 as part of the performance of processing the security alert. In this case, the identification of the request as being part of processing of the security alert occurs from the use of the anonymized information in the search by security analyst 301.

In response to the search request, agent 300 receives a response from sources 304 and applies the pattern matching information because the request was translated (step 315. In step 315, agent 300 applies pattern matching information specifically because the request was translated from an anonymized email address to the original email address. In other examples, this type of translation for masking can continue on a session or a request basis. In this example, security analyst 301 sees the response with the anonymized information (step 316).

At yet another later time, security analyst 301 searches for a friend, who just happens to be the same person in the security alert (step 317). In this case, agent 300 does not see anonymized information to translate and sends the search request directly without changes (step 318). In this case, agent 300 receives the response and sends the response without masking identity information (step 319). In step 319, the masking of identification does not occur because the search is not part of processing the security alert.

The illustration of a process for masking identity information in FIG. 3 is presented as one example and not meant to limit the manner in which other illustrative examples can be implemented. For example, in other illustrative examples, this process flow may be used to process tasks such as a financial transaction or ask instead of processing a security alert. In yet other illustrative examples other types of identity information may be masked in addition to an email address. For example, a name, an image, a profile picture, or other information can also be masked in the information returned to a user processing a task.

Figure 4:
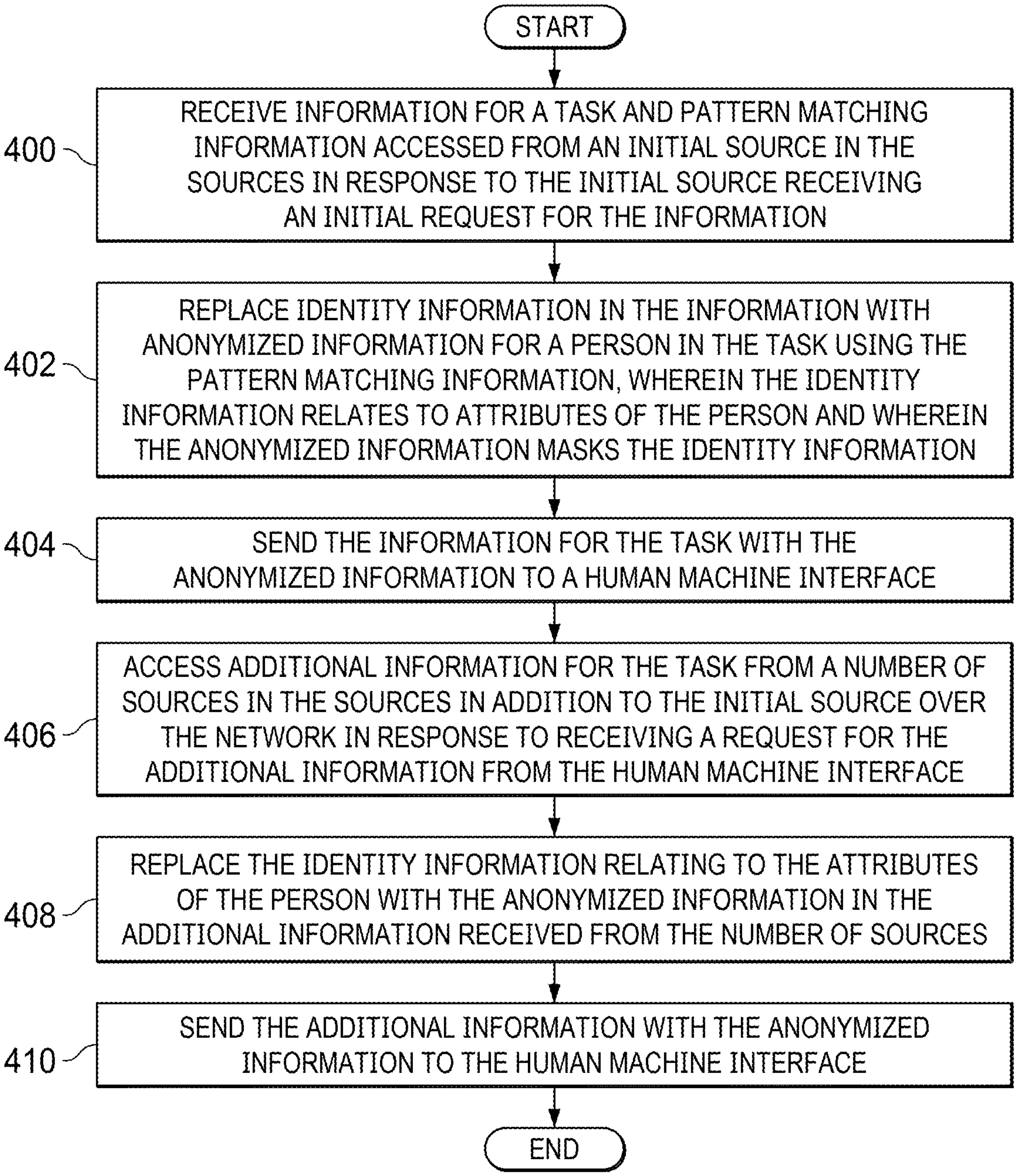
FIG. 4 is a flowchart of a process for masking information from sources accessed over a network in accordance with an illustrative embodiment.

Turning next to FIG. 4, a flowchart of a process for masking information from sources accessed over a network is depicted in accordance with an illustrative embodiment. The process in FIG. 4 can be implemented in hardware, software, or both. When implemented in software, the process can take the form of program instructions that are run by a processor set located in one or more hardware devices in one or more computer systems. For example, the process can be implemented in information controller 214 in computer system 212 in FIG. 2.

The process begins by receiving information for a task and pattern matching information accessed from an initial source in the sources in response to the initial source receiving an initial request for the information (step 400). In step 400, the pattern matching information comprises at least one of a pattern or a set of masking rules. The task can be selected from a group comprising processing a security alert, a candidate assessment, a mortgage underwriting, a credit assessment, and other types of tasks.

The process replaces identity information in the information with anonymized information for a person in the task using the pattern matching information, wherein the identity information relates to attributes of the person and wherein the anonymized information masks the identity information (step 402). In step 402, the replacement of the identity information occurs during at least one of a session during which the task is processed, a period of time, indefinitely, or some other condition or time. The process sends the information for the task with the anonymized information to a human machine interface (step 404).

The process accesses additional information for the task from a number of sources in the sources in addition to the initial source over the network in response to receiving a request for the additional information from the human machine interface (step 406). The process replaces the identity information relating to the attributes of the person with the anonymized information in the additional information received from the number of sources (step 408).

The process sends the additional information with the anonymized information to the human machine interface (step 410). The process terminates thereafter.

Figure 5:
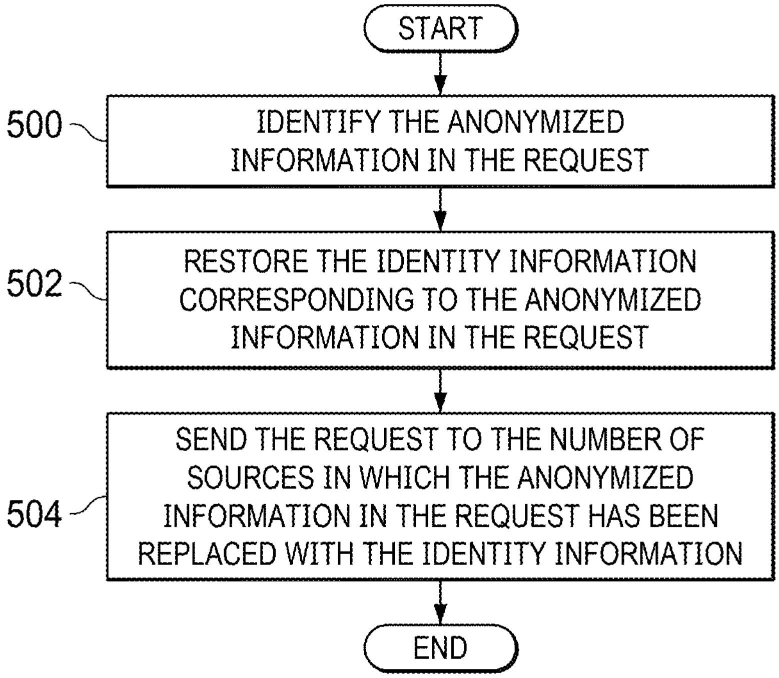
FIG. 5 is a flowchart of a process for accessing additional information in accordance with an illustrative embodiment.

With reference next to FIG. 5, a flowchart of a process for accessing additional information is depicted in accordance with an illustrative embodiment. The process in this flowchart is an example of an implementation for step 406 in FIG. 4.

The process identifies the anonymized information in the request (step 500). The process restores the identity information corresponding to the anonymized information in the request (step 502).

The process sends the request to the number of sources in which the anonymized information in the request has been replaced with the identity information (step 504). The process terminates thereafter.

Figure 6:
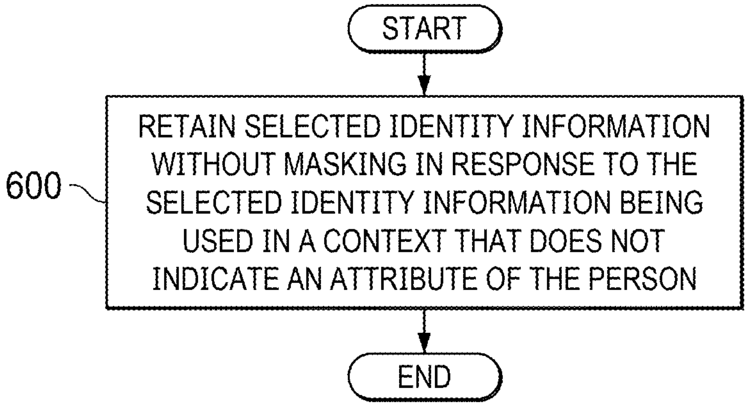
FIG. 6 is a flowchart of a process for retaining identity information in accordance with an illustrative embodiment.

Turning to FIG. 6, a flowchart of a process for retaining identity information is depicted in accordance with an illustrative embodiment. The step in this flowchart is an example of an additional step that can be performed with the steps in FIG. 4.

The process retains selected identity information without masking in response to the selected identity information being used in a context that does not indicate an attribute of the person (step 600). The process terminates thereafter.

Figure 7:
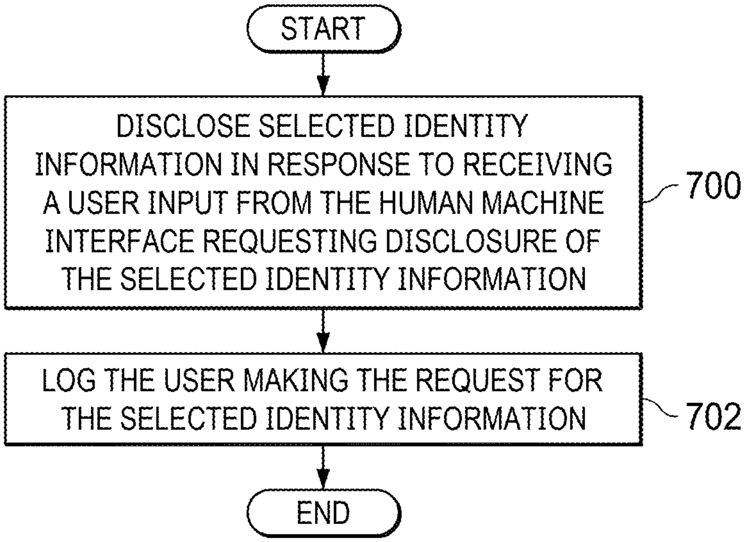
FIG. 7 is a flowchart of a process for disclosing identity information in accordance with an illustrative embodiment.

In FIG. 7, a flowchart of a process for disclosing identity information is depicted in accordance with an illustrative embodiment. The step in this flowchart is an example of an additional step that can be performed with the steps in FIG. 4.

The process discloses selected identity information in response to receiving a user input from the human machine interface requesting disclosure of the selected identity information (step 700) In step 700, the user input can be received from the selection of a reveal button. The process logs the user making the request for the selected identity information (step 702). The process terminates thereafter.

In this example, the process logs user's use of a reveal button, as well as other actions like whether a user chooses to "trust once" or "trust always" for a given site. This logging provides oversight into user behavior as well as analytics on usage. This may allow the process to adapt to identity information that a user frequently reveals, eliminating obfuscation of identity information to streamline the investigation process to processing a task such as a security alert. Logging of this activity is feasible in this case even though the functionality may be implemented in a client device because this tool can be used on an enterprise-owned device where the user cannot alter the client installation to disable logging.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 8:
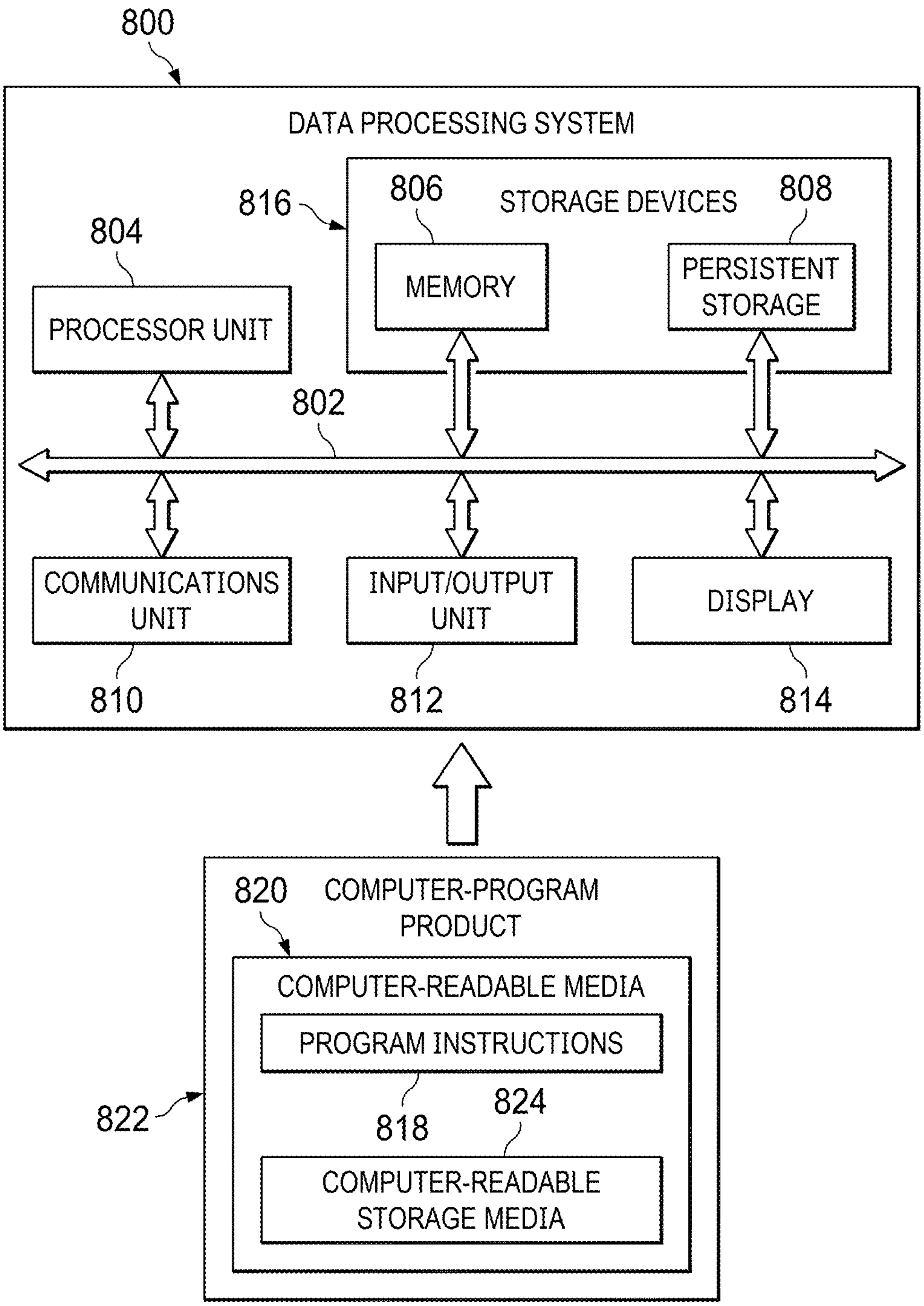
FIG. 8 is a block diagram of a data processing system in accordance with an illustrative embodiment.

Turning now to FIG. 8, a block diagram of a data processing system is depicted in accordance with an illustrative embodiment. Data processing system 800 can be used to implement computers and computing devices in computing environment 100 in FIG. 1. Data processing system 800 can also be used to implement computer system 212 in FIG. 2. In this illustrative example, data processing system 800 includes communications framework 802, which provides communications between processor unit 804, memory 806, persistent storage 808, communications unit 810, input/output (I/O) unit 812, and display 814. In this example, communications framework 802 takes the form of a bus system.

Processor unit 804 serves to execute instructions for software that can be loaded into memory 806. Processor unit 804 includes one or more processors. For example, processor unit 804 can be selected from at least one of a multicore processor, a central processing unit (CPU), a graphics processing unit (GPU), a physics processing unit (PPU), a digital signal processor (DSP), a network processor, or some other suitable type of processor. Further, processor unit 804 can be implemented using one or more heterogeneous processor systems in which a main processor is present with secondary processors on a single chip. As another illustrative example, processor unit 804 can be a symmetric multi-processor system containing multiple processors of the same type on a single chip.

Memory 806 and persistent storage 808 are examples of storage devices 816. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 816 may also be referred to as computer-readable storage devices in these illustrative examples. Memory 806, in these examples, can be, for example, a random-access memory or any other suitable volatile or non-volatile storage device. Persistent storage 808 may take various forms, depending on the particular implementation.

For example, persistent storage 808 may contain one or more components or devices. For example, persistent storage 808 can be a hard drive, a solid-state drive (SSD), a flash memory, a rewritable optical disk, a rewritable magnetic tape, or some combination of the above. The media used by persistent storage 808 also can be removable. For example, a removable hard drive can be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that can be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs can be located in storage devices 816, which are in communication with processor unit 804 through communications framework 802. The processes of the different embodiments can be performed by processor unit 804 using computer-implemented instructions, which may be located in a memory, such as memory 806.

These instructions are referred to as program instructions, computer usable program instructions, or computer-readable program instructions that can be read and executed by a processor in processor unit 804. The program instructions in the different embodiments can be embodied on different physical or computer-readable storage media, such as memory 806 or persistent storage 808.

Program instructions 818 are located in a functional form on computer-readable media 820 that is selectively removable and can be loaded onto or transferred to data processing system 800 for execution by processor unit 804. Program instructions 818 and computer-readable media 820 form computer program product 822 in these illustrative examples. In the illustrative example, computer-readable media 820 is computer-readable storage media 824.

Computer-readable storage media 824 is a physical or tangible storage device used to store program instructions 818 rather than a medium that propagates or transmits program instructions 818. Computer-readable storage media 824, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 818 can be transferred to data processing system 800 using a computer-readable signal media. The computer-readable signal media are signals and can be, for example, a propagated data signal containing program instructions 818. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 820" can be singular or plural. For example, program instructions 818 can be located in computer-readable media 820 in the form of a single storage device or system. In another example, program instructions 818 can be located in computer-readable media 820 that is distributed in multiple data processing systems. In other words, some instructions in program instructions 818 can be located in one data processing system while other instructions in program instructions 818 can be located in one data processing system. For example, a portion of program instructions 818 can be located in computer-readable media 820 in a server computer while another portion of program instructions 818 can be located in computer-readable media 820 located in a set of client computers.

The different components illustrated for data processing system 800 are not meant to provide architectural limitations to the manner in which different embodiments can be implemented. In some illustrative examples, one or more of the components may be incorporated in or otherwise form a portion of, another component. For example, memory 806, or portions thereof, may be incorporated in processor unit 804 in some illustrative examples. In other examples, more than one processor unit can be present. The different illustrative embodiments can be implemented in a data processing system including components in addition to or in place of those illustrated for data processing system 800. Other components shown in FIG. 8 can be varied from the illustrative examples shown. The different embodiments can be implemented using any hardware device or system capable of running program instructions 818.

Thus, illustrative embodiments of the present invention provide a computer implemented method, computer system, and computer program product for masking identity information in information sent over a network. In one example, a method masks information from sources accessed over a network. Information for a task and pattern matching information accessed from an initial source in the sources is received in response to the initial source receiving an initial request for the information. Identity information in the information is replaced with anonymized information for a person in the task using the pattern matching information. The identity information relates to attributes of the person and the anonymized information masks the identity information. The information for the task with the anonymized information is sent to a human machine interface. Additional information for the task is accessed from sources in response to receiving a request for the additional information. The identity information relating to the attributes is replaced with the anonymized information in the additional information. The additional information is sent with the anonymized information to the human machine interface.

With the masking of identity information for a person subject to a task in information from sources accessed over a network, undesired bias can be avoided in processing the task. Further, at least one of the particular identity information or rules for masking identity information can be performed consistently for different sources that may not be related or communicated with each other. In the illustrative example, pattern matching information comprises at least one of patterns or masking rules received in information from a source. This pattern matching information can be retained and applied to other sources that may be accessed to obtain information to perform the task. Additionally, the illustrative examples also restore identity information when anonymized information is used to perform a search. In these examples, the anonymized information is replaced with the corresponding identity information in response to a search being performed using the anonymized information. For example, a user may perform a search using an anonymized form of an email address and name of a person. In this example, the search is on another site other than the original source. This anonymized information in the search is replaced with the actual email address and name. The search is then sent on for processing. As a result, a user does not need to know the actual identity information to perform searches to obtain additional information in performing a task such as processing a security alert. These searches can be across unrelated sites and even sites not known in advance.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for masking information from sources accessed over a network, the method comprising:

receiving information for a task and pattern matching information accessed from an initial source in the sources in response to the initial source receiving an initial request for the information;

replacing, by a network-based agent executing on one or more processors, identity information in the information with anonymized information for a person in the task using the pattern matching information, wherein the pattern matching information comprises one or more patterns and masking rules, and wherein the identity information relates to attributes of the person and wherein the anonymized information masks the identity information;

sending the information for the task with the anonymized information to a human machine interface;

receiving, from the human machine interface, a request for additional information including the anonymized information;

identifying, by the network-based agent, the anonymized information and restoring the identity information corresponding to the anonymized information prior to transmission over the network;

accessing the additional information for the task from a number of sources in the sources in addition to the initial source over the network in response to receiving the request for the additional information from the human machine interface;

replacing the identity information relating to the attributes of the person with the anonymized information in the additional information received from the number of sources; and sending the additional information with the anonymized information to the human machine interface, wherein the information for the task is received in a body of a hypertext transfer protocol (HTTP) response and the pattern matching information is received in a response header in the hypertext transfer protocol response.

2. The method of claim 1, wherein said accessing the additional information comprises:

identifying the anonymized information in the request;

restoring the identity information corresponding to the anonymized information in the request; and sending the request to the number of sources in which the anonymized information in the request has been replaced with the identity information.

3. The method of claim 1 further comprising:

retaining selected identity information without masking in response to the selected identity information being used in a context that does not indicate an attribute of the person.

4. The method of claim 1 further comprising:

disclosing selected identity information in response to receiving a user input from the human machine interface requesting disclosure of the selected identity information; and logging a user making the request for the selected identity information.

5. The method of claim 1, wherein a replacement of the identity information occurs during at least one of a session during which the task is processed, a period of time, or indefinitely.

6. The method of claim 1, wherein the task is selected from a group comprising a security alert processing, a candidate assessment, a mortgage underwriting, and a credit assessment.

7. A computer system comprising:

a processor set;

a set of one or more computer-readable storage media; and program instructions, collectively stored in the set of one or more storage media to cause the processor set to perform operations comprising:

receiving information for a task and pattern matching information accessed from an initial source in sources in response to the initial source receiving an initial request for the information;

replacing, by a network-based agent executing on the processor set, identity information in the information with anonymized information for a person in the task using the pattern matching information, wherein the pattern matching information comprises one or more patterns and masking rules, and wherein the identity information relates to attributes of the person and wherein the anonymized information masks the identity information;

sending the information for the task with the anonymized information to a human machine interface;

receiving, from the human machine interface, a request for additional information including the anonymized information;

identifying, by the network-based agent, the anonymized information and restoring the identity information corresponding to the anonymized information prior to transmission over the network;

accessing the additional information for the task from a number of sources in the sources in addition to the initial source over a network in response to receiving the request for the additional information from the human machine interface;

replacing the identity information relating to the attributes of the person with the anonymized information in the additional information received from the number of sources; and sending the additional information with the anonymized information to the human machine interface, wherein the information for the task is received in a body of a hypertext transfer protocol (HTTP) response and the pattern matching information is received in a response header in the hypertext transfer protocol response.

8. The computer system of claim 7, wherein said accessing the additional information comprises:

identifying the anonymized information in the request;

restoring the identity information corresponding to the anonymized information in the request; and sending the request to the number of sources in which the anonymized information in the request has been replaced with the identity information.

9. The computer system of claim 7, wherein said replacing the identity information comprises:

retaining selected identity information without masking in response to the selected identity information being used in a context that does not indicate an attribute of the person.

10. The computer system of claim 7, wherein the operations further comprise:

disclosing selected identity information in response to receiving a user input from the human machine interface requesting disclosure of the selected identity information; and logging a user making the request for the selected identity information.

11. The computer system of claim 7, wherein a replacement of the identity information occurs during at least one of a session during which the task is processed, a period of time, or indefinitely.

12. The computer system of claim 7, wherein the task is selected from a group comprising security alert processing, a candidate assessment, a mortgage underwriting, and a credit assessment.

13. A computer program product for masking information from sources accessed over a network, the computer program product comprising:

a set of one or more computer-readable storage media;

program instructions stored on the set of one or more storage media to perform operations comprising:

receiving information for a task and pattern matching information accessed from an initial source in the sources in response to the initial source receiving an initial request for the information;

replacing, by a network-based agent executing on one or more processors, identity information in the information with anonymized information for a person in the task using the pattern matching information, wherein the pattern matching information comprises one or more patterns and masking rules, and wherein the identity information relates to attributes of the person and wherein the anonymized information masks the identity information;

sending the information for the task with the anonymized information to a human machine interface;

receiving, from the human machine interface, a request for additional information including the anonymized information;

identifying, by the network-based agent, the anonymized information and restoring the identity information corresponding to the anonymized information prior to transmission over the network;

accessing the additional information for the task from a number of sources in the sources in addition to the initial source over the network in response to receiving the request for the additional information from the human machine interface;

replacing the identity information relating to the attributes of the person with the anonymized information in the additional information received from the number of sources; and sending the additional information with the anonymized information to the human machine interface, wherein the information for the task is received in a body of a hypertext transfer protocol (HTTP) response and the pattern matching information is received in a response header in the hypertext transfer protocol response.

14. The computer program product of claim 13, wherein said accessing the additional information comprises:

identifying the anonymized information in the request;

restoring the identity information corresponding to the anonymized information in the request; and sending the request to the number of sources in which the anonymized information in the request has been replaced with the identity information.

15. The computer program product of claim 13, wherein said replacing the identity information comprises:

retaining selected identity information without masking in response to the selected identity information being used in a context that does not indicate an attribute of the person.

* * * * *